United States Patent [19]

Fujie

[11] Patent Number: 5,420,199
[45] Date of Patent: May 30, 1995

[54] THERMOPLASTIC POLYESTER RESIN COMPOSITION CONTAINING POLYBUTYLENE TEREPHTHALATE, MODIFIED POLYOLEFIN AND POLYCARBONATE RESINS

[75] Inventor: Hiroki Fujie, Sagamihara, Japan

[73] Assignee: Teijin Limited, Osaka, Japan

[21] Appl. No.: 203,496

[22] Filed: Feb. 28, 1994

Related U.S. Application Data

[63] Continuation of Ser. No. 18,535, Feb. 17, 1993, abandoned.

[30] Foreign Application Priority Data

Feb. 25, 1992 [JP] Japan ................... 4-037891

[51] Int. Cl.$^6$ ............... C08L 67/02; C08L 69/00
[52] U.S. Cl. ................. 525/67; 525/64; 525/133; 525/148; 525/286; 525/285
[58] Field of Search ............ 525/64, 67, 133, 148, 525/286

[56] References Cited

U.S. PATENT DOCUMENTS

| | | | |
|---|---|---|---|
| 5,208,287 | 5/1993 | Dekkers | 525/64 |
| 5,240,973 | 8/1993 | Katoh | 525/64 |

FOREIGN PATENT DOCUMENTS

| | | |
|---|---|---|
| 0409152 | 1/1991 | European Pat. Off. . |
| 465664 | 1/1992 | European Pat. Off. . |
| 2193853 | 2/1974 | France . |
| 2224505 | 10/1974 | France . |
| 221260 | 10/1986 | Japan . |
| 63-61045 | 3/1988 | Japan . |
| 046956 | 2/1992 | Japan . |
| 0228601 | 7/1987 | WIPO . |
| 9003993 | 4/1990 | WIPO . |
| 9102767 | 3/1991 | WIPO . |

OTHER PUBLICATIONS

Database WPI Week 8847, Derwent Publications Ltd., London, GB; AN 88-336072 Anonymous & Research Disclosure vol. 294, No. 028, 10 Oct. 1988.
Database WPI Week 7541, Derwent Publications Ltd., London, GB; An 75-67874W.
Chemical Abstracts, vol. 106, No. 10, 7 Sep. 1992, abstract No. 91474f.
Chemical Abstracts, vol. 106, No. 16, 20 Apr. 1987, abstract No. 120800q.
Chemical Abstracts, vol. 111, No. 20, 13 Nov. 1989, abstract No. 175414a.

*Primary Examiner*—David Buttner
*Attorney, Agent, or Firm*—Sherman and Shalloway

[57] ABSTRACT

A thermoplastic resin composition consisting essentially of (a) 50 to 90 % by weight of polybutylene terephthalate (component A), (b) 5 to 40 % by weight of modified polyolefin modified by an unsaturated monomer having a glycidyloxy group and an unsaturated monomer having a carboxyl group or an acid anhydride group (component B), (c) 5 to 40 % by weight of polycarbonate (component C); and molded articles prepared from the above thermoplastic resin composition.

The thermoplastic resin composition of the invention can give molded articles having excellent toughness, rigidity, strength and dimensional stability.

16 Claims, No Drawings

THERMOPLASTIC POLYESTER RESIN COMPOSITION CONTAINING POLYBUTYLENE TEREPHTHALATE, MODIFIED POLYOLEFIN AND POLYCARBONATE RESINS

This application is a continuation of application Ser. No. 08/018,535, filed Feb. 17, 1993, now abandoned.

DETAILED DESCRIPTION OF THE INVENTION

1. Field of the Invention

This invention relates to a thermoplastic resin composition and a molded article prepared therefrom. More specifically, the invention relates to a thermoplastic resin composition capable of giving molded articles having excellent toughness, rigidity, strength and dimensional stability.

2. Prior Art

An aromatic polyester resin, especially a polybutylene terephthalate (PBT) resin, is a thermoplastic material generally having a variety of excellent physical and mechanical properties such as thermal resistance and solvent resistance, and is suitably used for producing fibers, films or general molded articles by melt-molding.

In recent years, as home electric appliances, automobile parts or office machines have become light in weight and small in size, resin molded articles have been constructed increasingly in thin thickness. In this case, molded articles of a conventional PBT resin have defects that they are insufficient in toughness strength typified by impact strength and that they have inferior dimensional stability owing to shrinkage by crystallization. There is an increasing strong demand to improve these properties. As a technique of increasing toughness strength, Japanese Patent Publication No. 47419/1983 proposes a method in which an elastomer is added. But this method has a defect of reducing rigidity.

On the other hand, Japanese Laid-Open Patent Publication No. 59858/1992 describes a resin composition composed of a polyester and a modified polypropylene or a resin composition in which an unmodified polypropylene is further incorporated. The resin composition disclosed in the above Patent Publication is a resin composition composed of a modified polypropylene and an unmodified polypropylene as main components. The investigation of the present inventor has revealed that when the above modified polypropylene is compounded with PBT, the toughness of the molded article could not be said to be fully improved as compared with that of a PBT molded article. Furthermore, it has been found to have a defect that the molding shrinkage becomes large.

Problems to be Solved by the Invention

It is an object of this invention, therefore, to provide a resin composition capable of giving molded articles having an increased toughness strength typified by impact strength without sacrificing the excellent properties of the PBT resin, particularly flexural modulus, and having excellent dimensional stability not affected by thermal shrinkage.

Another object of the invention is to provide a PBT resin composition capable of giving a PBT resin molded article having required properties, such as flexural modulus, impact strength and dimensional stability, of above certain levels, which are well balanced.

A further object of this invention is to provide a PBT resin composition having good moldability.

A still other object of this invention is to provide a PBT resin molded article having well-balanced properties.

Means for Solving the Problems

Investigations of the present inventor led to the discovery that these objects of the present invention can be achieved by a thermoplastic resin composition consisting essentially of:

(a) 50 to 90 % by weight of polybutylene terephthalate (component A), (b) 5 to 40 % by weight of a modified polyolefin modified by an unsaturated monomer having a glycidyloxy group and an unsaturated monomer having a carboxyl group or an acid anhydride group (component B), and (c) 5 to 40 by weight of a polycarbonate (component C);

and a molded article prepared from said composition.

The thermoplastic resin composition and the molded article prepared therefrom, provided by this invention, will be described specifically in detail.

The polybutylene terephthalate resin (component A) used in this invention is all aromatic polyester derived from terephthalic acid as a main dicarboxylic acid component and tetramethylene glycol as a main diol component. The component A includes not only homopolybutylene terephthalate, but also copolybutylene terephthalate having butylene terephthalate as a main recurring unit. The copolybutylene terephthalate may contain 20 mol % or below of a dicarboxylic acid component other than the terephthalic acid component, and a diol component other than the tetramethylene glycol component may be contained in an amount of 20 mol % or below. Examples of the dicarboxylic acid component that can be copolymerized include aromatic dicarboxylic acids such as isophthalic acid, naphthalene-2,6-dicarboxylic acid, naphthalene-2,7-dicarboxylic acid and naphthalene-1,5-dicarboxylic acid; and aliphatic dicarboxylic acids such as adipic acid and sebacic acid. The aromatic dicarboxylic acids including terephthalic acid and aliphatic dicarboxylic acids may be their ester-forming derivatives such as esters thereof.

Examples of the diol component that can be copolymerized may include aliphatic glycols such as ethylene glycol, hexamethylene glycol, diethylene glycol and cyclohexane dimethanol; and diols having an aromatic ring, such as 1,4-bisoxyethoxybenzene and bisphenol A. These diol components may be their ester-forming derivatives such as esters thereof.

The polybutylene terephthalate as the component A desirably has an intrinsic viscosity $[\eta]$ of about 0.3 to about 1.5, preferably about 0.5 to about 1.2. The intrinsic viscosity $[\eta]$ is calculated from the viscosity obtained by dissolving 1.2 g of the polymer in 100 ml of orthochlorophenol and measured for its viscosity at a temperature of 35° C. If the intrinsic viscosity $[\eta]$ of polybutylene terephthalate is less than 0.3, the impact strength or compatibility of the molded article becomes low. If it exceeds 1.5, the flowability of the composition is decreased, and hence, the molding processability of the composition becomes insufficient.

The modified polyolefin as component B in the resin composition of this invention is a polyolefin modified by two types of unsaturated monomers. One type of the unsaturated monomer is an unsaturated monomer having a glycidyloxy group

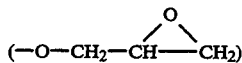

and the other type of the unsaturated monomer is an unsaturated monomer having a carboxyl group or an acid anhydride group.

Examples of the unsaturated monomer having a glycidyloxy group are glycidyl methacrylate, glycidyl acrylate, and compounds represented by the following the general formula (1), $$(CH_2=CR-CO-NH-CH_2-)_n-Ar \quad (1)$$

wherein Ar is an aromatic hydrocarbon group selected from monocyclic and fused-cyclic groups having at least one glycidyloxy group bonded to the aromatic ring, preferably a phenol group, R is a hydrogen atom or a methyl group, and n is an integer of 1 to 4. Examples of the unsaturated monomers having a carboxyl group or an acid anhydride group include unsaturated carboxylic acids and acid anhydrides thereof, and are, for example, monocarboxylic acids such as acrylic acid and methacrylic acid; dicarboxylic acids such as maleic acid, fumaric acid and itaconic acid; and dicarboxylic acid anhydrides such as maleic anhydride and itaconic anhydride. Of these, maleic anhydride is preferred.

Examples of an olefin monomer forming the modified polyolefin (component B) include α-olefins such as ethylene, propylene, 1-butene, 1-pentene and 4-methyl-1-pentene. Non-conjugated diene monomers of the following formula (2), $$CH_2=CR_1-(CH_2)_m-R_2C=CR_3-R_4 \quad (2)$$

wherein each of $R_1$ to $R_4$ represents a hydrogen atom or an alkyl group having 1 to 6 carbon atoms, and m is an integer of 1 to 20.

These olefins may be used alone or as mixtures of two or more. As required, 10 % or less by weight of a monomer such as vinyl acetate, isoprene, chloroprene and butadiene may be added to the olefin. Preferred are ethylene, propylene and an ethylene/propylene mixture. The ethylene/propylene mixture is especially preferred.

In the modified polyolefin as component B, there are two typified methods by which the polyolefin is modified by the two types of unsaturated monomers. One is a method to graft the polyolefin with two types of the unsaturated monomers. The other is a method to add two types of the unsaturated monomers at the time of polymerizing the olefin and perform random copolymerization or block copolymerization.

One method of obtaining the modified polyolefin (component B) comprises reacting an unsaturated monomer having a glycidyloxy group and an unsaturated monomer having a carboxyl group or an acid anhydride group with a polyolefin such as polyethylene, polypropylene or an ethylene-propylene copolymer in the presence of a radical initiator. Thus, a modified polyolefin in which the unsaturated monomers are grafted can be obtained. The above grafting reaction may be carried out by a solution method or a melt-kneading method.

In the modified polyolefin (component B), modification has been made by 0.05 to 15 % by weight, preferably 1 to 10 % by weight, of the unsaturated monomer having a glycidyloxy group, and by 0.01 to 2% by weight, preferably 0.05 to 1% by weight, of the unsaturated monomer having a carboxyl group or an acid anhydride group. If the modification proportion of the unsaturated monomer having a glycidyloxy group is less than 0.05% by weight, the modified polyolefin has a low reactivity with the component A and poor compatibility. Furthermore, if the modification proportion of the unsaturated monomer having a carboxyl group or an anhydride group is less than 0.01% by weight, the reactivity and compatibility of the modified polyolefin likewise become insufficient. On the other hand, if the modification proportion of the unsaturated monomer having a glycidyloxy group exceeds 15 % by weight or the modification proportion of the unsaturated monomer having a carboxyl group or an acid anhydride group exceeds 2 % by weight, the reactivity of the component B with the component A becomes high. As a result, the composition has a high melt viscosity and gelation undesirably occurs.

At least one olefin-type elastomers selected from ethylene-propylene-diene ternary copolymer rubber, ethylene-propylene copolymer rubber, ethylene-butylene copolymer rubber, etc. may be blended, in an amount of 40 % by weight or below, with the component B.

Advantageously, the modified polyolefin (component B) has a melt flow rate (MFR) value of about 0.1 to about 50 g/10 min., preferably about 5 to about 30 g/10 min. The MFR value is measured at 230° C. under a load of 2,160 g (ASTM D-1238). If the modified polyolefin has an MFR value of less than 0.1, the flowability of the composition is lowered and so its molding processability becomes insufficient. On the other hand, if its MFR value exceeds 50, the improvement effect on increasing the impact strength of the molded article decreases.

The polycarbonate (component C) used in this invention is a resin produced from a divalent phenol and a carbonate precursor such as phosgene, halogen formates and carbonate esters. Examples of the divalent phenol include bisphenol A, hydroquinone, 2,2-bis-(4-hydroxyphenyl)methane, 2,4'-dihydroxydiphenylmethane, bis-(2-hydroxyphenyl)methane and bis-(4-hydroxyphenol)methane.

A resin produced from bisphenol A as the divalent phenol and phosgene as the carbonate precursor is preferred.

The polycarbonate (component C) has a weight average molecular weight, based on a solution viscosity, of about 10,000 to about 100,000, preferably about 20,000 to about 40,000. If the molecular weight of polycarbonate is less than 10,000, the sufficient effect of improving the impact strength of the molded article cannot be obtained. If the molecular weight exceeds 100,000, the flowability and molding processability are lowered.

The mixing proportion of polybutylene terephthalate (component A), the modified polyolefin (component B) and polycarbonate (component C) are shown below. The proportion of polybutylene terephthalate (component A) is 50 to 90 % by weight, preferably 55 to 85 % by weight, especially preferably 60 to 80 % by weight. The proportion of the modified polyolefin (component B) is 5 to 40 % by weight, preferably 10 to 20 % by weight. The proportion of polycarbonate (component C) is 5 to 40 % by weight, preferably 10 to 30 % by weight. If the mixing proportion of the modified polyolefin (component B) is less than 5 % by weight, the impact strength of the resulting resin molded article cannot be sufficiently increased. On the other hand, if it exceeds 40 % by weight, the rigidity and thermal resistance of the resulting molded article are undesirably much deteriorated. Furthermore, if the mixing proportion of the polycarbonate (component C) is less than 5 % by weight, the resulting molded article has a reduced rigidity. If it exceeds 40 % by weight, the solvent resistance of the molded article is undesirably decreased.

The resin composition of this invention may contain various additives to an extent not deviating from the scope of the object of the invention. Examples of the additives include phenolic antioxidants, phosphoric antioxidants, sulfur-type antioxidants, ultraviolet absorbers, mold releasing agents, fire retardants, inorganic fillers and coloring agents. As such additives, generally known additives for resins can be used according to various objects.

The phenolic antioxidants are referred to hindered phenolic compounds which are generally added to improve the thermal resistance of resins. They include 2,6-di-t-butyl-p-cresol, 2,2'-methylene-bis(4-methyl-6-t-butylphenol), 4,4'-thiobis(3-methyl-6-t-butylphenol), 1,1,3-tris(2-methyl-4-hydroxy-5-t-butyl-phenol)butane, pentaerythrityl-tetrakis[3-(3,5-di-t-butyl-4-hydroxyphenyl)propionate]and octadecyl-3-(3,5-di-t-butyl-4-hydroxyphenyl)propionate.

Examples of the phosphoric antioxidants include triphenyl phosphite, trioctadecyl phosphite, trinonylphenyl phosphite, trilauryltrithio phosphite, bis(2,4-di-t-butylphenyl)pentaerythritol diphosphite, bis(3-methyl-1,5-di-t-butylphenyl)pentaerythritol diphosphite and tris(2,4-di-t-butylphenyl) phosphite.

Molded articles of the thermoplastic resin composition of this invention can be obtained by known methods. Specifically, the components A, B and C, as required, together with additive(s) are melted and mixed by a mixing means such as a Bumbury's mixer, a heating roll, a monoaxial or multiaxial extruder, and then molding the mixture.

EXAMPLES

The following Examples specifically illustrate the present invention. But the present invention will not be limited to the following Examples without departing from the gist thereof.

In the following Examples, all percentages are on a weight basis (weight %). The flexural modulus was measured by ASTM D-790 and the impact strength was measured by ASTM d-258.

The dimensional stability was determined by injection-molding a flat plate having a thickness of 1.5 mm and measuring its molding shrinkage.

Molding shrinkage (%)={[(size of the mold)−(size of the molded article)]/(size of the mold)}×100

In the following Examples and Comparative Examples, the following polybutylene terephthalate (component A), the modified polyolefin (component B) and polycarbonate (component C) were used.

(A) Polybutylene terephthalate:
 (a) Polybutylene terephthalate having an intrinsic viscosity of 1.10.
 (a') Polybutylene terephthalate having an intrinsic viscosity of 0.70.

(B) Modified polyolefin:
 (b) Modified polyolefin 1 (to be abbreviated as PO1): 100 Parts by weight of a propylene-ethylene copolymer having a propylene/ethylene ratio of 80:20 by weight, 5 parts by weight of glycidyl methacrylate, 1 part by weight of maleic anhydride and 0.3 part of a radical initiator [Triganox 101-40MD, supplied by Kayaku Akzo Co., Ltd.] were uniformly mixed, and the mixture was kneaded at 200° C. by a biaxial kneader to obtain a modified polyolefin PO1.

(ii) Modified polyolefin 2 (to be abbreviated as PO2): 100 parts by weight of a propylene-ethylene copolymer having a propylene/ethylene ratio of 80:20 by weight, 5 parts by weight of a glycidyloxy group-containing compound of the following formula (3)

$$CH_2=CH-CO-NH-CH_2-\underset{CH_3}{\overset{CH_3}{\bigcirc}}-O-CH_2-CH-CH_2 \quad (3)$$
$$\diagdown O \diagup$$

[AXE, supplied by Kanegafuchi Kagaku Kogyo K.K.], 1 part by weight of maleic anhydride, and 0.3 part by weight of a radical initiator [Trigonox 101-40MD, supplied by Kayaku Akzo Co., Ltd.]were uniformly mixed, and the mixture was kneaded in the same manner as in the production of PO1 to obtain PO2.

(b') Unmodified polyolefin:
 Polypropylene having an MFR value of 5.0 g/10 min.
(c) Polycarbonate:
 Panlite L-1250, supplied by Teijin Chemical Co., Ltd. (weight average molecular weight of 25,000

Examples 1 to 5 and Comparative Examples 1 to 7

Polybutylene terephthalate (component A), the modified polyolefin (component B) and polycarbonate (component C) were uniformly mixed in the proportions shown in Table 1 by V-type blender. The resulting mixture was melted and kneaded by a biaxial extruder having a diameter of 44 mm to obtain molding pellets.

The pellets were dried at 130° C. for 5 hours, and then molded by an injection molding machine to obtain test pieces for measuring physical properties and a flat plate for the measurement of molding shrinkage.

The physical properties and molding shrinkages of the resulting test pieces are shown in Table 1.

TABLE 1

|  | Examples | | | | | Comparative Examples | | | | | | |
|---|---|---|---|---|---|---|---|---|---|---|---|---|
|  | 1 | 2 | 3 | 4 | 5 | 1 | 2 | 3 | 4 | 5 | 6 | 7 |
| Composition (%) | | | | | | | | | | | | |
| (a) Polybutylene terephthalate | 65 | 55 | 75 | 50 | 65 | 100 | 65 | 80 | 77 | 67 | 10 | |
| (a') Polyethylene terephthalate | | | | | | | | | | | | 65 |
| (b) Modified polyolefin | | | | | | | | | | | | |

TABLE 1-continued

|  | Examples | | | | | Comparative Examples | | | | | | |
|---|---|---|---|---|---|---|---|---|---|---|---|---|
|  | 1 | 2 | 3 | 4 | 5 | 1 | 2 | 3 | 4 | 5 | 6 | 7 |
| PO1 | 15 | 15 | 15 | 30 |  |  |  |  | 3 | 30 | 45 | 15 |
| PO2 |  |  |  |  | 15 |  |  |  |  |  |  |  |
| (b') Unmodified polyolefin |  |  |  |  |  |  | 15 |  |  |  |  |  |
| (c) Polycarbonate | 20 | 30 | 10 | 20 | 20 | — | 20 | 20 | 20 | 3 | 45 | 20 |
| Properties |  |  |  |  |  |  |  |  |  |  |  |  |
| Flexural modulus (MPa) | 1920 | 2000 | 1830 | 1760 | 1890 | 2250 | 1950 | 2300 | 2260 | 1570 | 1400 | 1750 |
| Tensile elongation (*) (J/m) | 170 | 165 | 176 | 154 | 181 | 191 | 47 | 163 | 173 | 34 | 23 | 56 |
| Impact strength (**) (J/m) | 96 | 111 | 82 | 123 | 101 | 34 | 52 | 48 | 58 | 108 | 160 | 89 |
| Molding shrinkage (%) | 1.2 | 1.1 | 1.3 | 1.3 | 1.2 | 1.5 | 1.3 | 1.3 | 1.3 | 1.6 | 1.1 | 1.2 |
| Remark |  |  |  |  |  |  | (1) |  |  |  | (1) | (2) |

In Table,
(*)Tensile elongation: ASTM type-4 test piece (thickness 1 mm)
(**)Impact strength: Thickness ⅛", with mechanically processed notch Remark (1): When a molded ASTM type-4 tensile piece was bent, peeling was observed.

Remark (2): At the time of molding, poor mold releasing occurred.

What is claimed:

1. A thermoplastic resin composition consisting essentially of:
   (a) 50 to 90 % by weight of polybutylene terephthalate (component A),
   (b) 5 to 40 % by weight of modified polyolefin modified by an unsaturated monomer having a glycidyloxy group and an unsaturated monomer having a carboxyl group or an acid anhydride group (component B),
   (c) 5 to 40 % by weight of polycarbonate (component C).

2. The thermoplastic resin composition of claim 1, which consists essentially of:
   (a) 55 to 80 % by weight of the polybutylene terephthalate (component A),
   (b) 10 to 20 % by weight of the modified polyolefin (component B), and
   (c) 10 to 30 % by weight of the polycarbonate (component C).

3. The thermoplastic resin composition of claim 1 or 2, wherein the modified polyolefin (component B) is polyethylene, polypropylene or an ethylene-propylene copolymer modified by an unsaturated monomer having a glycidyloxy group and an unsaturated monomer having a carboxyl group or an acid anhydride group.

4. The thermoplastic resin composition of claim 1 or 2, wherein the modified polyolefin (component B) is a modified polyolefin modified by 0.05 to 15 % by weight of the unsaturated monomer having a glycidyloxy group and 0.01 to 2 % by weight of the unsaturated monomer having a carboxyl group or an acid anhydride group, based on the polyolefin.

5. The thermoplastic resin composition of claim 1 or 2, wherein the modified polyolefin (component B) is an ethylene-propylene copolymer modified with 0.05 to 15 % by weight of glycidyl methacrylate and 0.01 to 2% by weight of maleic anhydride, based on the olefin.

6. The thermoplastic resin composition of claim 1 or 2, wherein the polycarbonate (component C) is a bisphenol polycarbonate.

7. A molded article having the thermoplastic resin composition of claim 1 as a resin component.

8. A molded article having the thermoplastic resin composition of claim 2 as a resin component.

9. A thermoplastic resin composition consisting essentially of:
   (a) 55 to 80% by weight of polybutylene terephthalate (component A),
   (b) 10 to 20% by weight of modified polyolefin (compound B), wherein the polyolefin is polyethylene, polypropylene or ethylene/propylene copolymer, modified by grafting to the polyolefin 1 to 10% by weight of unsaturated monomer having a glycidyloxy group and 0.05 to 1% by weight of unsaturated monomer having a carboxyl group or an acid anhydride group, based on the polyolefin, and
   (c) 10 to 30% by weight of polycarbonate (component C), produced from a divalent phenol compound and carbonate precursor and having a weight average molecular weight of 10,000 to 100,000.

10. A thermoplastic resin composition consisting essentially of:
    (a) 55 to 80% by weight of polybutylene terephthalate (component A),
    (b) 10 to 20% by weight of modified ethylene/propylene copolymer (component B), modified by grafting to the ethylene/propylene copolymer 1 to 10% by weight of glycidyl methacrylate and 0.05 to 1% by weight of maleic anhydride, based on the polyolefin, and
    (c) 10 to 30% by weight of polycarbonate (compound C), produced from a divalent bisphenol compound and phosgene carbonate precursor and having a weight average molecular weight of 20,000 to 40,000.

11. A molded article having the thermoplastic resin composition of claim 9 as a resin component.

12. A molded article having the thermoplastic resin composition of claim 10 as a resin component.

13. The thermoplastic resin composition of claim 9 wherein the polybutylene terephthalate (component A) has an intrinsic viscosity ($\eta$) of about 0.3 to about 1.5 measured at a temperature of 35° C.

14. The thermoplastic resin composition of claim 9 wherein the modified polyolefin (component B) has a melt flow rate (MFR) of about 0.1 to about 50 g/10 min. measured at 230° C.

15. The thermoplastic resin composition of claim 10 wherein the polybutylene terephthalate (component A) has an intrinsic viscosity ($\eta$) of about 0.5 to 1.2 measured at a temperature of 35° C.

16. The thermoplastic resin composition of claim 15 wherein the modified polyolefin (compound B) has a melt flow rate (MFR) of about 5 to about 30 g/10 min. measured at 230° C.

* * * * *